Patented Apr. 17, 1945

2,373,690

UNITED STATES PATENT OFFICE 2,373,690

PROCESS FOR PRODUCING ARTIFICIAL LUMBER

Paul Kenda, San Antonio, Tex.

No Drawing. Application April 24, 1942,
Serial No. 440,356

1 Claim. (Cl. 260—816)

(Granted under the act of March 3, 1883, as amended April 30, 1928; 370 O. G. 757)

The invention described herein may be manufactured and used by or for the Government for governmental purposes, without payment to me of any royalty thereon.

This invention relates to an improved process for producing artificial lumber and more particularly to an artificial lumber produced from poinsettia plants.

In view of the continued depletion of our national resources of lumber, it is an object of my invention to produce a substitute therefor which may be produced from poinsettia plants.

My experiments have shown that the poinsettia plant may be grown on irrigated lands in the South practically all the year round and produces a yield of substantially thirty tons per acre. Accordingly, it is another object of my invention to provide a process which will utilize these plants in producing artificial lumber. It is my opinion that such utilization will be of great benefit to the farmer in particular and to the nation at large.

It is a further object of my invention to provide a process whereby artificial lumber may be produced in any desired shape, whereby construction therefrom may be simplified.

These and other objects and advantages of my invention will become apparent upon a consideration of the following detailed description of my improved process.

The shrub is harvested and immediately upon being brought in from the fields, while the latex therein is still liquid, ground to a size substantially one-tenth of one inch. The ground material, including any latex which drips off the grinder during the grinding process, is put into a cylinder which is connected with a steam boiler. The water used in the steam boiler preferably is mixed with acetic acid in the proportion of five gallons of acid to one hundred gallons of water. The ground material is maintained in a wet steam bath for approximately ten minutes, after which the pressure is gradually increased to substantially one hundred and seventy-five pounds per square inch gauge pressure. Upon reaching the peak pressure, the steam is suddenly released to substantially atmospheric pressure. This sudden release in pressure results in the explosion of the saturated material and its complete disintegration and releases the latex confined therein as is described in my copending application for United States Letters Patent Serial No. 437,926, for a Process of Producing and utilizing guayule rubber, filed April 7, 1942.

The exploded material including both the pulp and the released rubber is then removed from the cylinder and dried to a paste containing not over two percent moisture, measured by hygrometer. The paste is then put into desired forms and placed under a compression of substantially two thousand pounds per square inch. The finished product is then dried in natural air for one week, after which it is ready for use.

Since the coagulated latex produced by my process acts as a binder for the finished product, there is produced an article harder than beaverboard, but highly resistant to fracture under stress.

While I have described my invention with particularity, it is to be understood that I do not wish to be limited to the exact details disclosed since various modifications within the spirit of the invention will suggest themselves to those skilled in the art.

Having described my invention, what I claim as new and wish to secure by Letters Patent is:

A method of producing lumber from poinsettia plants in which the latex is enclosed within plant cells, which comprises grinding the plant material into small particles while the latex is still fresh to loosen the fibers without destroying the fiber structure, digesting said particles with steam and acetic acid in a cylinder for a period of about ten minutes, increasing the pressure of the steam during said period until at the end thereof said steam pressure is about 175 lbs. per square inch, releasing the pressure substantially instantaneously to explode the cells of the plant material and intermingle the latex with the woody material, drying the integrate to a paste without agglomeration, molding said paste under pressure of about 2000 lbs. per square inch and curing said molded paste.

PAUL KENDA.